United States Patent
Basson et al.

(10) Patent No.: US 8,243,749 B2
(45) Date of Patent: Aug. 14, 2012

(54) WIRELESS COMMUNICATION SYSTEM, ASSOCIATED METHODS AND DATA STRUCTURES

(75) Inventors: Gal Basson, Haifa (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 990 days.

(21) Appl. No.: 11/645,789

(22) Filed: Dec. 27, 2006

(65) Prior Publication Data
US 2007/0195811 A1    Aug. 23, 2007

Related U.S. Application Data

(63) Continuation-in-part of application No. 11/292,909, filed on Dec. 1, 2005, now Pat. No. 8,200,164.

(51) Int. Cl.
| | |
|---|---|
| *H04B 7/216* | (2006.01) |
| *H04B 1/44* | (2006.01) |
| *H04B 1/38* | (2006.01) |
| *H04B 7/02* | (2006.01) |
| *H04W 4/00* | (2009.01) |
| *H04L 1/00* | (2006.01) |
| *H04L 12/16* | (2006.01) |
| *H04L 27/28* | (2006.01) |
| *H04M 1/00* | (2006.01) |

(52) U.S. Cl. ........ 370/441; 370/342; 370/334; 370/252; 370/329; 370/267; 370/282; 370/338; 455/562.1; 455/466; 455/73; 375/267; 375/260; 375/219; 375/138

(58) Field of Classification Search .................. 370/441; 455/441
See application file for complete search history.

(56) References Cited

U.S. PATENT DOCUMENTS
5,862,132 A    1/1999    Blanchard et al.
(Continued)

FOREIGN PATENT DOCUMENTS
JP    2005-198213    7/2005
(Continued)

OTHER PUBLICATIONS

"IEEE P802.11n/D1.0 Draft Amendment to Standard [For] Information Technology—Telecommunications and information exchange between systems-Local and Metropolitan networks Specific requirements-Part 11: Wireless LAN Medium Access Control (MAC) and Physical Layer (PHY) Specifications: Enhancements for Higher Throughput" 2006, the IEEE, New-York, NY, USA; p. i-vii & p. 1-328.
(Continued)

*Primary Examiner* — Dwayne Bost
*Assistant Examiner* — Timothy Pham
(74) *Attorney, Agent, or Firm* — Shichrur & Co.

(57) ABSTRACT

A wireless communication device, and a wireless communication system and a method of beamforming is presented. The wireless communication system and/or device includes a beamformee unit, a beamformer unit and two or more antennas to transmit the data unit and the protocol data unit according to the beamformee and the beamformer units, respectively. The beamformee conveys feedback information by a data unit in one of the feedback positions that include an immediate feedback position, an aggregated feedback position and a delayed feedback position. The beamformer unit generates a protocol data unit including a control field that includes one of the feedback request information types which is selected from a Channel State Information or uncompressed Steering Matrix or compressed Steering Matrix to request feedback from a remote communication device.

41 Claims, 5 Drawing Sheets

U.S. PATENT DOCUMENTS

| | | | |
|---|---|---|---|
| 5,912,887 | A | 6/1999 | Sehgal |
| 6,144,711 | A | 11/2000 | Raleigh et al. |
| 6,778,612 | B1 | 8/2004 | Lozano et al. |
| 7,280,625 | B2 | 10/2007 | Ketchum et al. |
| 7,366,245 | B2 | 4/2008 | Li et al. |
| 7,369,511 | B2 | 5/2008 | Utsunomiya et al. |
| 7,417,974 | B2 | 8/2008 | Hansen |
| 7,486,720 | B2 | 2/2009 | Molisch et al. |
| 7,493,664 | B2 | 2/2009 | Riccobon |
| 7,508,778 | B2 | 3/2009 | Yafuso et al. |
| 7,522,555 | B2 | 4/2009 | Li et al. |
| 7,555,053 | B2 | 6/2009 | Trachewsky et al. |
| 7,564,831 | B2 | 7/2009 | Ihm et al. |
| 7,564,914 | B2 | 7/2009 | Hansen et al. |
| 7,719,993 | B2 | 5/2010 | Li et al. |
| 2004/0229653 | A1 | 11/2004 | Chotkowski et al. |
| 2005/0037799 | A1 | 2/2005 | Braun et al. |
| 2006/0094373 | A1* | 5/2006 | Hottinen .................... 455/73 |
| 2006/0111129 | A1* | 5/2006 | Ihm et al. ................. 455/466 |
| 2006/0146725 | A1* | 7/2006 | Li et al. .................... 370/252 |
| 2006/0165008 | A1* | 7/2006 | Li et al. .................... 370/252 |
| 2006/0291544 | A1 | 12/2006 | Fischer et al. |
| 2007/0104129 | A1 | 5/2007 | Yang et al. |
| 2007/0104288 | A1 | 5/2007 | Kim |
| 2008/0005219 | A1* | 1/2008 | Nabar et al. ............... 709/201 |
| 2009/0086690 | A1* | 4/2009 | Gu et al. .................. 370/338 |

FOREIGN PATENT DOCUMENTS

| | | |
|---|---|---|
| JP | 2005-198213 A | 7/2005 |
| WO | WO 03/049353 A | 6/2003 |

OTHER PUBLICATIONS

Eklund, C et al. "IEEE Standard 802.16: A Technical Overview of the WirelessMAN Air Interface for Broadband Wireless Access" 2002, the IEEE, New-York, NY, USA; p. 98-107.

"IEEE P802.16e/D9 Draft IEEE Standard for Local and Metropolitan Area Networks Part 16: Air Interface for Fixed and Mobile Broadband Wireless Access Systems Amendment for Physical and Medium Access Control Layers for Combined Fixed and Mobile Operation in Licensed Bands" 2005, the IEEE, New-York, NY, USA; p. i-xxvi & p. 1-630.

International Search Report and Written Opinion from PCT/US2006/045698, International filing Date Nov. 29, 2006. Date Mailed Jul. 4, 2007.

Matthew Gast, "802.11 Wireless Networks: The Definitive Guide, Second Edition" Internet Citation, Apr. 2005, XP002414302, p. 327, paragraph 2; p. 336, paragraph 3-p. 339.

Punnoose R J et al, "Communications resources management for advanced telematics applications" Intellegent Transportation Systems, 2001. Proceedings. 2001 IEEE Aug. 25-29, 2001, Piscataway, NJ, USA, IEEE XP010555921, p. 1059, right hand column, paragraph 3.

3GPP TSG RAN WG1 31, "Tdoc R1-03-0286 Text proposal on CQI Emhancements for TR on HSDPA Enhancements" TSG-RAN WG1 #31, Feb. 18, 2003, XP002312853.

Xia P et al, "Multiantenna Adaptive Modulation with Beamforming based on Bandwidth-Constrained Feedback" IEEE Transactions on Communications, IEEE Service Center, Piscataway, NJ, US, Mar. 3, 2005 XP001227565, p. 528 right hand column, paragraph 2.

Office Action Received for Chinese Patent Application No. 200680039913.8, Mailed on Nov. 12, 2010, 3 pages of Office Action and 2 pages of English Translation.

International Preliminary Report on Patentability Received for PCT application No. PCT/US2006/045698, mailed on Jun. 12, 2008, 13 pages.

Notification of Reason(s) for Refusal for JP P2008-535805 mailed on Feb. 7, 2011, 3 pages of Office Action and 3 pages of English Translation.

Office Action Received for European Patent Application No. 06838583.0, Mailed on Dec. 15, 2008, 3 pages.

Office Action, issued Jun. 1, 2010, for U.S. Appl. No. 11/292,909.

Office Action for CN 200680039913.8 Mailed on Jun. 2, 2011.

Matthew S. Gast, "802.11 Wireless Networks, The Definitive Guide, Second Edition", pp. 325-340, Apr. 30, 2005.

Office Action of U.S. Appl. No. 11/292,909, mailed on Aug. 28, 2009.

Final Office Action, issued Feb. 23, 2010, in connection with U.S. Appl. No. 11/292,909.

Office Action for CN 200680039913.8 Mailed on Sep. 26, 2011.

Office Action for EP 06 838 583.0 mailed on Dec. 7, 2011.

Notification of Reason(s) for Refusal for JP P2008-535805 mailed on Jul. 19, 2011.

Office Action for Japanese Patent Application P2008-535805 mailed on Apr. 9, 2012; 10 pages.

* cited by examiner

WIRELESS COMMUNICATION SYSTEM, ASSOCIATED METHODS AND DATA STRUCTURES

CROSS REFERENCE TO RELATED APPLICATIONS

This application is a continuation-in-part (CIP) of U.S. patent application Ser. No. 11/292,909, filed on Dec. 1, 2005 (and entitled WIRELESS COMMUNICATION SYSTEM, ASSOCIATED METHODS AND DATA STRUCTURES), which is incorporated in its entirety herein by reference.

BACKGROUND OF THE INVENTION

Embodiments of the invention are generally directed to communication systems and, more particularly, to an apparatus, methods and data structures to exchange channel state information in a wireless communication system.

Performance improvement in wireless communication systems may be achieved if the channel charactersitics are known by the transmitter, or source of a wireless communication signal. Conventional techniques for providing the transmitter with information associated with such channel characteristics suffer many implementation-centric limitations, which limit their practicality. An improved apparatus, methods and associated data structures overcoming at least one of these practical limitations is provided in the disclosure, below.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
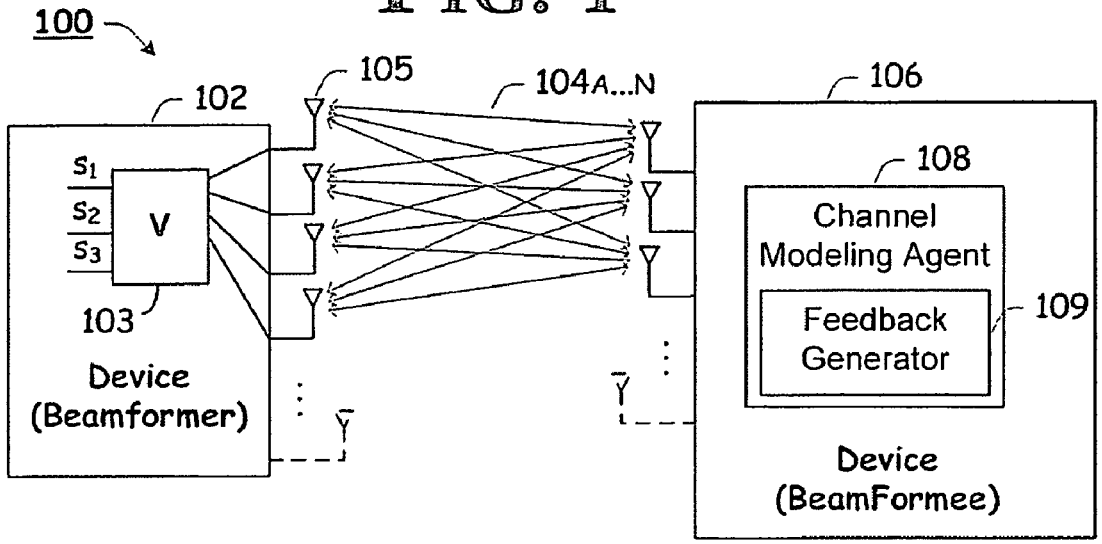
FIG. 1 is a schematic illustration of a block diagram of a wireless communication system according to exemplary embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of a wireless communication system, methods and associated data structures is disclosed herein. More specifically, embodiments of a system, apparatus, methods and associated data structures to enable the request and/or feedback of a channel state information (CSI).

According to one embodiment described more fully below, one or more data structures are introduced, e.g., for use in physical layer (PHY) and/or Media Access Control (MAC) communication messages. For example, according to one embodiment described more fully below, one or more of a feedback request field in a high throughput (FIT) control field and/or a CSI feedback QoS data and HTC frame are generally introduced. Moreover, with the support of such data structures, an innovative CSI feedback mechanism that enables the exchange of feedback information in support of at least dynamic link adaptation and/or transmit beamforming is presented.

According to one embodiment, the channel modeling agent (CMA) with a feedback generator is implemented in a communications device which may implement one or more features introduced above, although the invention is not limited in this regard. As developed more fully below, the CMA may be engaged by a host communications device to enable the exchange of CSI with a remote communications device using, e.g., one or more of the innovative data structures introduced above. According to one embodiment, the CMA may be invoked to determine channel state information associated with a wireless communication channel established with at least one other (remote) communications device(s).

According to one embodiment: a communications device may implement a beamformee that includes a feedback generator and the CMA to facilitate the communication of information associated with the determined CSI with at least a subset of the remote one or more communication device(s). According to one embodiment, the innovative data structures introduced above may be employed by the feedback generator to respond or convey information associated with such CSI. The communication device may include a beamformer to initiate and to receive the CSI and other feedback information and may form a beam accordingly.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Technical detail regarding some of the operating characteristics of the mobile devices and/or the wireless communication network(s) in which the CMA may be implemented may be found in, e.g., the IEEE 802.11, 1999 Edition; Information Technology Telecommunications and Information Exchange Between Systems—Local and Metropolitan Area Networks—Specific Requirements, Part 11: WLAN Medium Access Control (MAC) and Physical (PHY) Layer Specifications, its progeny and supplements thereto (e.g., 802.11a, .11g and .11n). See, also, the IEEE Std 802.16-2001 IEEE Std. 802.16-2001 IEEE Standard for Local and Metropolitan area networks Part 16: Air Interface for Fixed Broadband Wireless Access Systems, its progeny and supplements thereto (e.g., 802.16a, .16d, and .16e).

Turning first to FIG. 1, a block diagram of a wireless communication system 100 according to exemplary embodiments of the invention is shown. In accordance with the illustrated example embodiment of FIG. 1, an example communications system 100 is depicted comprising one wireless communications device 102 in communication with another wireless communications device 106 through a wireless communication link 104. As used herein, wireless communication system 100 is intended to represent any of a wide range of wireless communication networks including, but not limited to a near-field communication (NFC) network, a wireless local area network (WLAN), a wireless metropolitan area network (WMAN), a cellular radiotelephony network, a personal communication system (PCS) network, and the like.

According to one embodiment, wireless communication system 100 may include an 802.11 and/or an 802.16 communication network, where device 102 may be an access point (AP) (or, a base station) while device 106 may be a subscriber station (or, end user device), although the scope of the invention is not limited in this regard. As shown, one or more of device(s) 102, 106 may include multiple transmit and/or receive chains representing a multiple input multiple output (MIMO) communications system.

In a closed-loop MIMO (or, beamforming) system, device 102 may be referred as a beamformer and device 106 may be referred as beamformee, although the scope of the present invention is not limited in this regard. In beamformer (e.g., device 102), a data signal is modified by a beamforming matrix V 103, and then selectively transmitted by a plurality of antennas 105 to a remote receiver. According to one embodiment, the data signal may comprise a number of data streams ($N_1 \ldots N_s$), although the invention is not limited in this regard. The number of data streams may represent the number of spatial channels, with appropriate bit-loading, power weighting and subcarrier assignments, although the invention is not limited in this regard.

According to one embodiment, with four (4) transmit antennas and three (3) data streams (for ease of illustration), the transmitted signal (x) transmitted via the $N_1$ antenna may be represented as:

$$x = V \times s \qquad (1)$$

where $$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \text{ and } s = \begin{bmatrix} s_3 \\ s_2 \\ s_3 \end{bmatrix}$$

As shown, s is an $N_s$-vector of data symbols, and V is the $N_1$ by $N_s$ beamforming matrix developed from information (e.g., matrix codebook(s) and or indices thereto) feedback from a remote receiver. According to one embodiment, the beamforming matrix V is unitary and power/bit loading is applied on vector s, as introduced above.

Device 106 (e.g., beamformee) is depicted comprising a channel modeling agent (CMA) 108 to dynamically generate a model of the wireless communication channel, e.g., by measuring one or more channel characteristics. According to one embodiment, channel state information (CSI) depicting one or more elements of the channel model and/or the channel characteristics may be generated by CMA 108.

According to one embodiment, a feedback generation mechanism (e.g., feedback generator 109) may be invoked to support the communication of the channel state information to other, remote, communication device(s). According to one embodiment described more fully below, the feedback generation mechanism may utilize or more of the data strictures introduced above to request, respond and/or convey channel state information, e.g., in support of dynamic link adaptation, beamforming, etc. According to one embodiment, one or more of such data structures may be implemented within the physical layer convergence protocol (PLCP), e.g., within PLCP protocol data unit(s) (PPDU), although the scope of the invention is not limited in this regard.

It will be appreciated that, but for the introduction of the CMA 108 and/or the feedback generator 109, device (e.g., Beamformee) 106 is intended to represent any of a wide variety of electronic device(s) with wireless communication capability. In some embodiments, CMA 108 may well be implemented within a receiver element of a device, e.g., in a baseband and/or applications processor of the receiver. Similarly, the feedback generation mechanism (e.g., feedback generator 109) may be implemented in hardware, software and/or firmware and/or in any combination of hardware, software and/or firmware and the data structures may be invoked in PHY or MAC layer communications, although the scope of the claimed invention is not limited in this regard.

Figure 2:
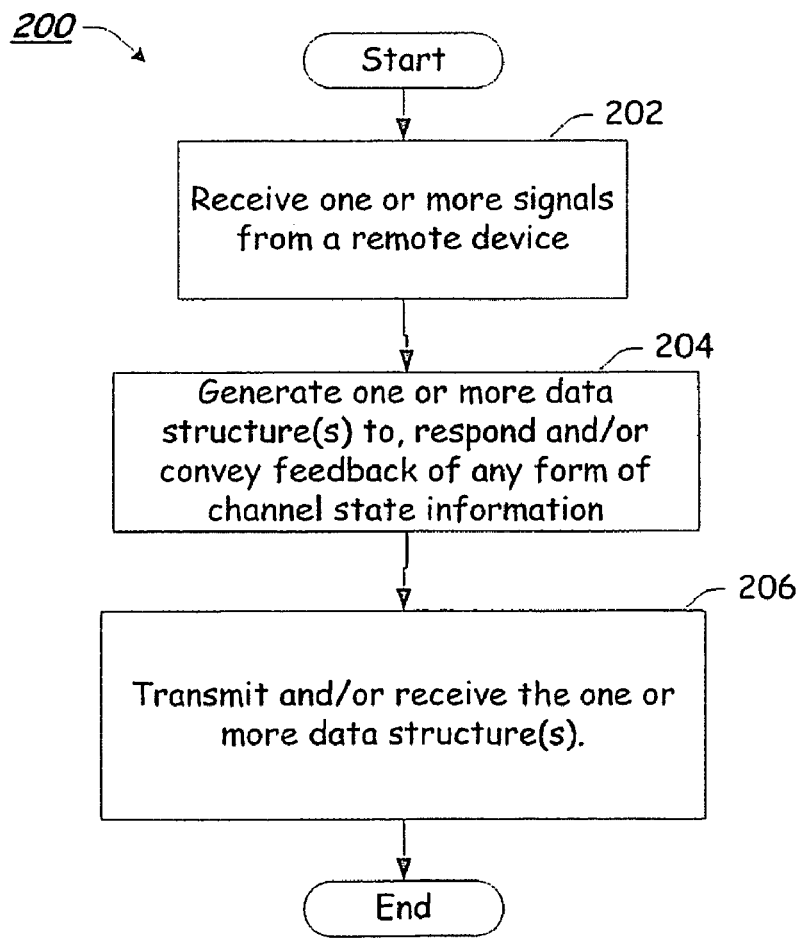
FIG. 2 is a schematic illustration of flow chart of a method for the exchange of channel state information according to exemplary embodiment of the present invention.

Turning to FIG. 2, a flow chart of a method for the exchange of channel state information (CSI), according to exemplary embodiment of the present invention is shown. Although the scope of the present invention is not limited in this respect, the method begins with block 202 wherein a communications device (e.g., 106) receives one or more communications signal(s) from one or more remote transmitter(s) (e.g., 102).

In block 204, the communications device (e.g., 106) invokes a channel modeling agent (CMA) (e.g., 108) that may measure one or more characteristics of at least a subset of the received signal(s). According to one embodiments the communications device (e.g., 106) may respond and/or convey channel state information (e.g., associated with the information generated by the CMA 108, and/or equivalent information generated at remote device(s)) from/to one or more remote devices, e.g., utilizing the data structures introduced above.

More particularly, the feedback generator mechanism 109 may utilize one or more of the following data structures in support of the response and/or exchange of channel state information, according to one exemplary embodiment of the present invention.

High Throughput Control (HTC) Field Data Structure

According to one embodiment the CSI/Steering field may be included in MAC Header. According to one embodiment the CSI/Steering field may be included in High Throughput Control (HTC) field and the HTC field data structure may be included in any frame except a non-QoS Data frame. A MAC protocol data unit (MPDU) that contains the HT control field may be referred to as an +HTC frame. An example format CSI/Steering field of 2 bits included in 4-octet HT Control Field is shown in the following table:

TABLE 1

Example HT Control field format

| #Bits | B0-B15 | B20-21 | B22-23 | B25-29 |
|---|---|---|---|---|
| | | | CSI/Steering 2 | |

A definition of CSI/Steering bits is depicted below by Table 2:

TABLE 2

Example CSI/Steering field format

| Field | Meaning | Definition |
|---|---|---|
| CSI/Steering | Type of feedback | 00 - No feedback required<br>01 - CSI<br>10 - uncompressed Steering Matrix<br>11 - compressed Steering Matrix |

CSI Feedback QoS-Null+HTC Frame Data Structure

According to one embodiment, a CSI Feedback frame is introduced. According to one embodiment, the CSI feedback frame may be implemented, for example as a QoS-null with HTC field or as no-Ack subtype of management frame. According to one embodiment, the following table (e.g., Table 3) defines an example acknowledge (Ack) policy in the QoS control field. The Extension of the HTC filed may be set as follows:

TABLE 3

QoS Control Ack Policy for CSI feedback

| Request Mode | Ack policy |
|---|---|
| Solicited (in the same TxOP of request) | No Ack |
| Unsolicited (separate access) | Normal Ack |

According to embodiment of the present invention, this frame allows submitting of the feedback as part of aggregation or as an immediate feedback. While transmitting this frame no acknowledgement may be required. With embodiments of the inventions a special subtype of no-Ack may be used in the frame type of management for managing the CSI feedback, if desired. Table 4 depicts at least a portion of an exemplary no-ACK frame.

TABLE 4

Ack Policy for CSI feedback

| Type value b3 b2 | Type description | Subtype value b7 b6 b5 b4 | Subtype description |
|---|---|---|---|
| 00 | Management | 1110 | Action no-ACK |

According to one exemplary embodiment of the present invention, the format of the frame body may be derived from the management action frame. According to one example implementation, the CSI Feedback frame may be of category Transmit Beamforming.

Table 5 depicts orders which may be utilized by a Beamformee to control a beamforming by the CSI feedback, if desired.

TABLE 5

CSI Feedback

| Order | Information | Name | Size | Value |
|---|---|---|---|---|
| 1 | Category | TxBF | 1 | 6 |
| 2 | Action | CSI Feedback | 1 | 2 |

TABLE 5-continued

CSI Feedback

| Order | Information | Name | Size | Value |
|---|---|---|---|---|
| 3 | Transmit Beamforming Control that includes minimal grouping | Transmit Beamforming Control | 2 | |
| 4 | Vector Quantized CSI Feedback Information | Vector Quantized Explicit Feedback Information | Variable | |

According to embodiments of the present invention, the beamformee may use one or more grouping methods to group adjacent subcarriers in order to reduce the wireless communication network overhead, if desired. According to an exemplary embodiment of the invention, the Beamformee may use a grouping method to reduce the size of the CSI Matrices Report, for example the size of the CSI Matrices Report may be $Nr \times 8 + Ns \times (3 + 2 \times Nb \times Nc \times Nr)$ bits, where the number of subcarriers sent Ns is a function of Ng. Table 8 is an example of deferent grouping method of grouping base on a band wide of the transmission.

TABLE 6

Grouping

| BW and Grouping | Ns | Carriers for which matrices are sent |
|---|---|---|
| 20 MHz<br>Ng = 1 | 56 | All data and pilot carriers: −28, −27, . . . −2, −1, 1, 2, . . . 27, 28 |
| 20 MHz<br>Ng = 2 | 30 | −28, −26, −24, −22, −20, −18, −16, −14, −12, −10, −8, −6, −4, −2, −1, 1, 3, 5, 7, 9, 11, 13, 15, 17, 19, 21, 23, 25, 27, 28 |
| 20 MHz<br>Ng = 4 | 16 | −28, −24, −20, −16, −12, −8, −4, −1, 1, 5, 9, 13, 17, 21, 25, 28 |

According to this exemplary embodiment of the invention, a first communications device (e.g., Beamformer) requests and uses the CSI feedback for transmit beamforming. The frame exchange may also accommodate computation of the steering vectors at the Initiator of the communication. In this case, instead of sending back steering vectors, the responding communication device(s) (e.g., Beamformee) may return quantized channel estimates to the initiating Beamformer, and the Beamformer will compute the steering vectors, although the invention is not limited in this regard. As in the last case the quantized channel estimates may be used for Modulation Coding Schemes (MCS) optimization out of transmit beamforming. According to one example implementation, the type of information returned to CSI feedback requestor is subject of advertised capabilities.

Beamformee Response Capabilities

According to embodiments of the present invention, the Beamformee may response to the Beamformer request(s) according to the Beamformee capabilities. The Beamformee capabilities may depict in table 8 and may include the flowing capabilities: immediate feedback which includes an immediate feedback in a default communication mode and an immediate feedback in an aggregate communication mode. Table 7 depicts the Beamformee feedback capabilities.

TABLE 7

Beamformee feedback capabilities

| B11 | B12 | B13 | B14 | B15 | B16 | B17 | B18 | B19 | B31 |
|---|---|---|---|---|---|---|---|---|---|
| Explicit TxBF CSI feedback | | Explicit uncompressed Steering Matrix feedback | | Explicit compressed Steering Matrix feedback | | Minimal grouping | | | |

TABLE 8

Beamformee feedback capabilities description

| TxBF Capability field | Definition | Encoding |
|---|---|---|
| Explicit BF CSI feedback | Indicates whether or not this receiver can return CSI explicit feedback. | Set to 00 if not supported<br>01 indicates delayed feedback<br>10 indicates immediate feedback<br>11 indicates delayed and immediate feedback |
| Explicit non-compressed Steering Matrix feedback | Indicates whether or not this receiver can return non-compressed Steering Matrix explicit feedback. | Set to 00 if not supported<br>01 indicates delayed feedback<br>10 indicates immediate feedback<br>11 indicates delayed and immediate feedback |
| Explicit compressed Steering Matrix feedback | Indicates whether or not this STA can apply transmit beamforming using explicit compressed Steering Matrix feedback. | Set to 00 if not supported<br>01 indicates delayed feedback<br>10 indicates immediate feedback<br>11 indicates delayed and immediate feedback |
| Minimal grouping | Minimal grouping used for explicit feeback report | Set to 00 if support groups of 1 (no grouping)<br>01 indicates groups of 1, 2<br>10 indicates group of 1, 4<br>11 indicates groups of 1, 2, 4 |

Beamformee Feedback Response Timing

Figure 3:
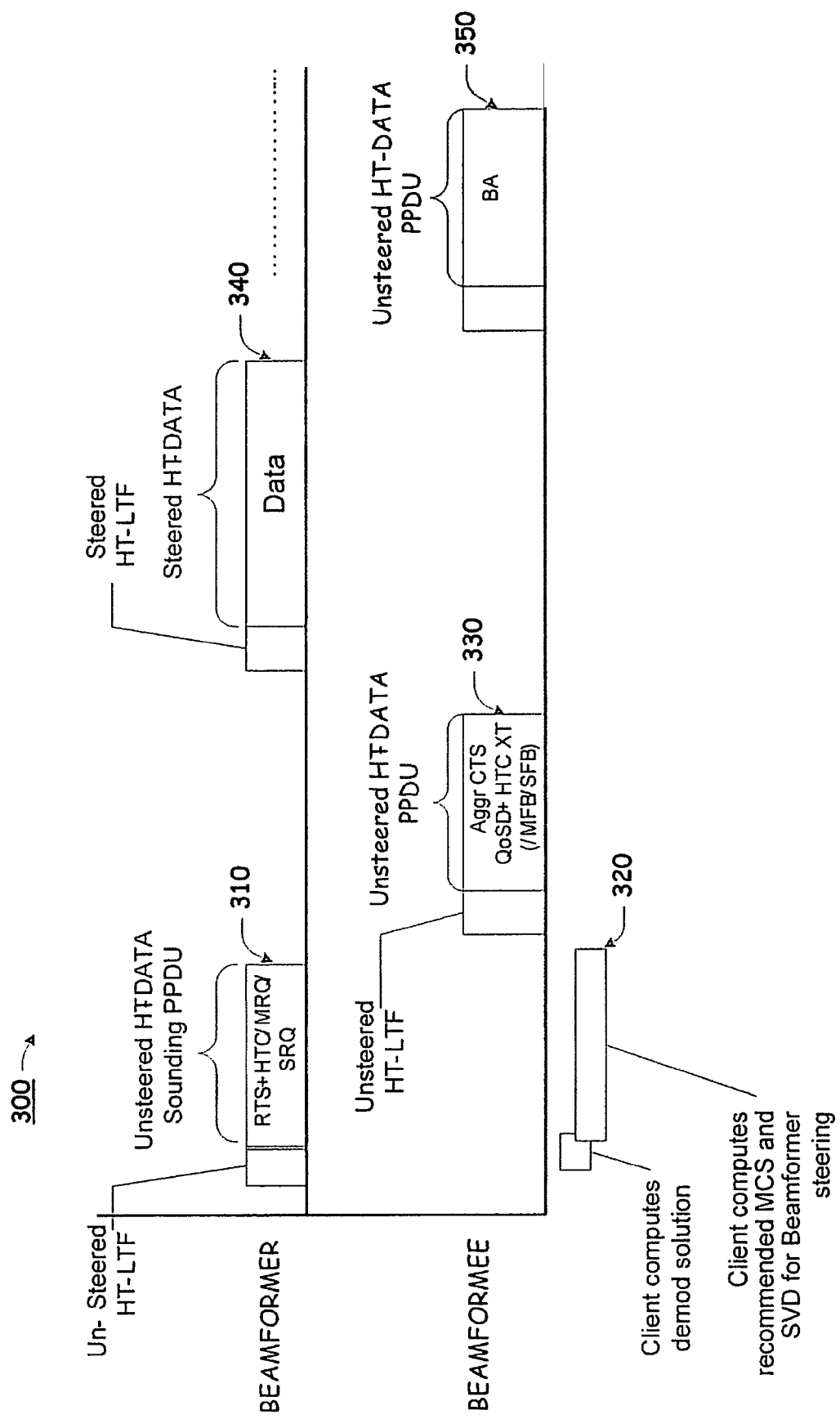
FIG. 3 is a schematic illustration of a time diagram to provide a graphical representations of an aggregated communications exchange in accordance with one exemplary embodiment of the invention.
Figure 4:
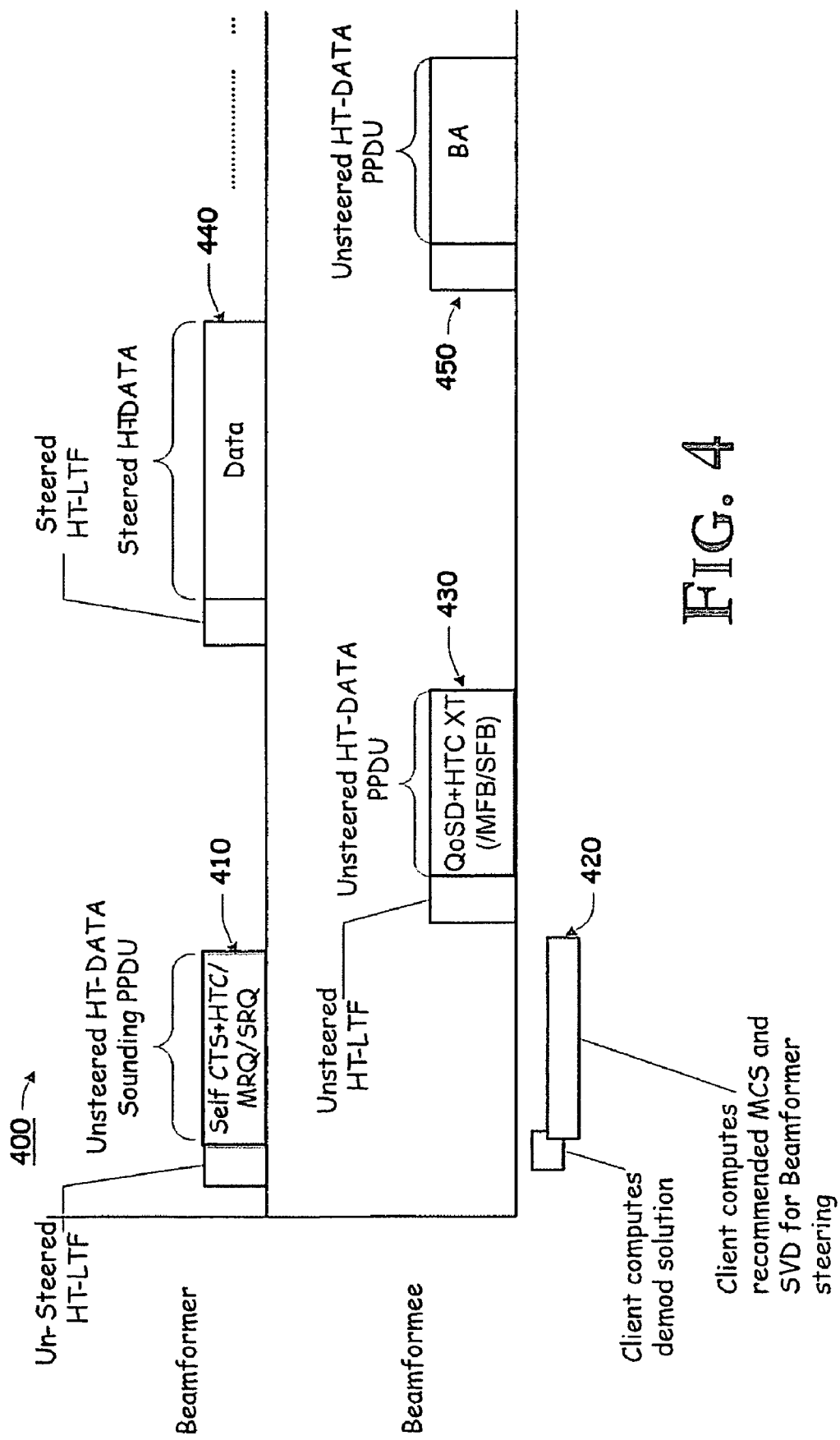
FIG. 4 is a schematic illustration of a time diagram to provide graphical representations of an immediate communications in accordance with one exemplary embodiment of the invention.
Figure 5:
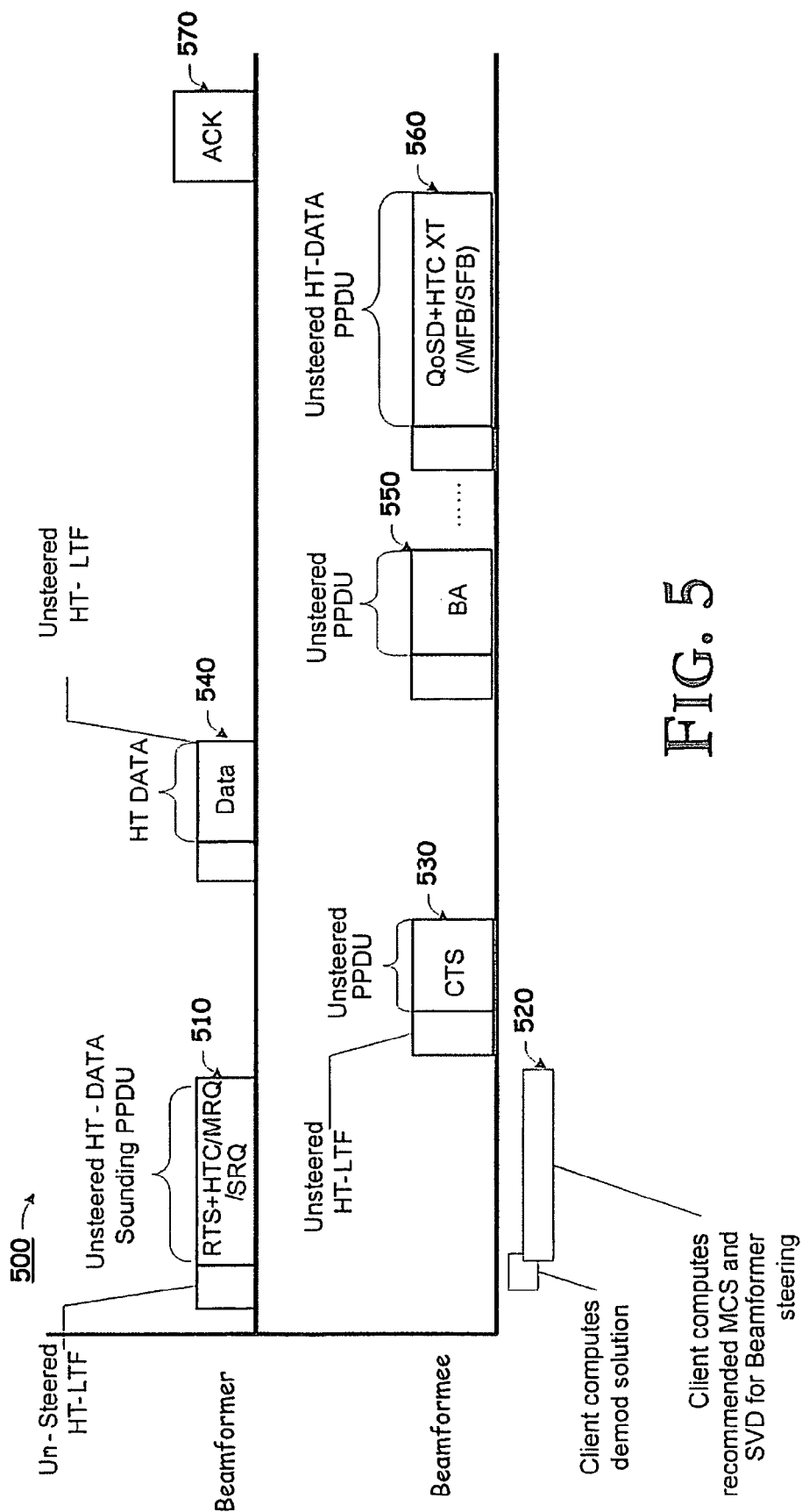
FIG. 5 is a schematic illustration of a time diagram to provide graphical representations of a delayed communications in accordance with one exemplary embodiment of the invention.

Detailed description of exchanging communication according to Beamformee response capabilities will be present in FIGS. 3, 4 and 5.

According to one embodiment, the CSI feedback mechanism introduced herein enables the exchange of explicit feedback for Link Adaptation as well for Transmit beam forming. One example of the basic frame exchange is depicted in FIG. 3, although the scope of the invention is not limited in this regard.

Turning to FIG. 3, a schematic illustration of a time diagram to provide graphical representations of an aggregated communications exchange in accordance with one exemplary embodiment of the invention is shown. According to some exemplary embodiments of the invention CSI feedback information may be immediately aggregated with the MAC response (e.g., CTS, ACK, BA and the like).

For example, the communication sequence may include:
1. The sequence is initiated by a Beamformer which sends an unsteered HT-DATA sounding PPDU 310 containing a request to send (RTS), Modulation and Coding Scheme Request (MRQ) and a CSI Feedback Request (SRQ);
2. The responding client (e.g., Beamformee) uses the sounding packet to make a channel estimate, and computes the singular value decomposition (SVD) and Modulation and Coding Scheme (MCS) of the channel 320;
3. The resulting steering vectors are quantized and returned to the Beamformer in an unsteered HT-DATA PPDU containing an aggregated clear to send (CTS), an MCS feedback (MFB) and a steering feedback (SFB) message 330;
4. The Beamformer uses the result to transmit a steered PPDU to the Beamformee 340. If the Beamformer has subsequent PPDUs to send in steered mode, this PPDU should also be a sounding PPDU; and
5. The Beamformee may respond with an unsteered HT_DATA PPDU including block acknowledge (BA) 350

Actions 4 and 5 may be repeated for an ongoing beamforming exchange. If latencies cause the channel estimates or steering vectors to get stale, then actions one to three need to be repeated.

Turning to FIG. 4, a schematic illustration of a time diagram to provide graphical representations of an immediate communications in accordance with one exemplary embodiment of the invention is shown. According to this exemplary embodiment of the invention, the beamformee may send feedback response information immediately ((e.g., in a system predefined time) after the reception of a sounding PPDU. If the Beamformee may not transmit the immediate CSI/Steering response information immediately (e.g., in a system predefined time after the end of the received sounding packet), the Beamformee may transmit the feedback response information in an aggregate with an ACK or BA in the same TxOP.

For example, the communication sequence according this exemplary embodiment may include:
1. The sequence is initiated by a Beamformer which sends an unsteered FT-DATA sounding PPDU 410 containing a clear to send to self (CTS to self). MRQ and SRQ;
2. The responding client (e.g., Beamformee) uses the sounding packet to make a channel estimate, and computes the SVD and MFB of the channel 420;
3. The resulting steering vectors are quantized and returned to the Beamformer in a PPDU containing an MFB and a steering feedback (SFB) message 430;
4. The Beamformer uses the result to transmit a steered PPDU to the Beamformee 440. If the Beamformer has subsequent PPDUs to send in steered mode, this PPDU may also be a sounding PPDU, if desired: and 5. The Beamformee may respond with an unsteered HT_DATA PPDU including block acknowledge (BA) 450

Actions 4, and 5 may be repeated for an ongoing beamforming exchange. If latencies cause the channel estimates or steering vectors to get stale, then actions one to three need to be repeated Turning to FIG. 5, a schematic illustration of a time diagram to provide-graphical representations of a delayed communications in accordance with one exemplary embodiment of the invention is shown. According to this exemplary embodiment of the invention the beamformee may send delayed feedback response information according the Beamformee response timing capabilities.

For example, the communication sequence according this exemplary embodiment may include:
1. The sequence is initiated by a Beamformer which sends an unsteered HT-DATA sounding PPDU 510 containing a RTS, MRQ and SRQ;
2. The responding client (e.g., Beamformee) uses the sounding packet to make a channel estimate and computes the SVD and MFB of the channel 520;
3. The resulting steering vectors are quantized in 520;
4. The responding client (e.g., Beamformee) returns to the Beamformer an Unsteered PPDU containing a CTS 53*o*;
5. The Beamformer continues to transmit an unsteered PPDU 540 including data to the Beamformee;
6. The Beamformee may respond with an unsteered HT_DATA PPDU including BA 550;
7. The Beamformee may transmit a PPDU containing an MFB and a steering feedback (SFB) message 560 after getting link access rights on its own, if desired; and
8. The Beamformer may response with ACK 570.
9. The Beamformer may use the gotten MFB and SFB to steer the following transmissions of the HIT DATA PPDUs to the Beamformee (not seen in the figure)

Alternate Embodiment(s)

Figure 6:
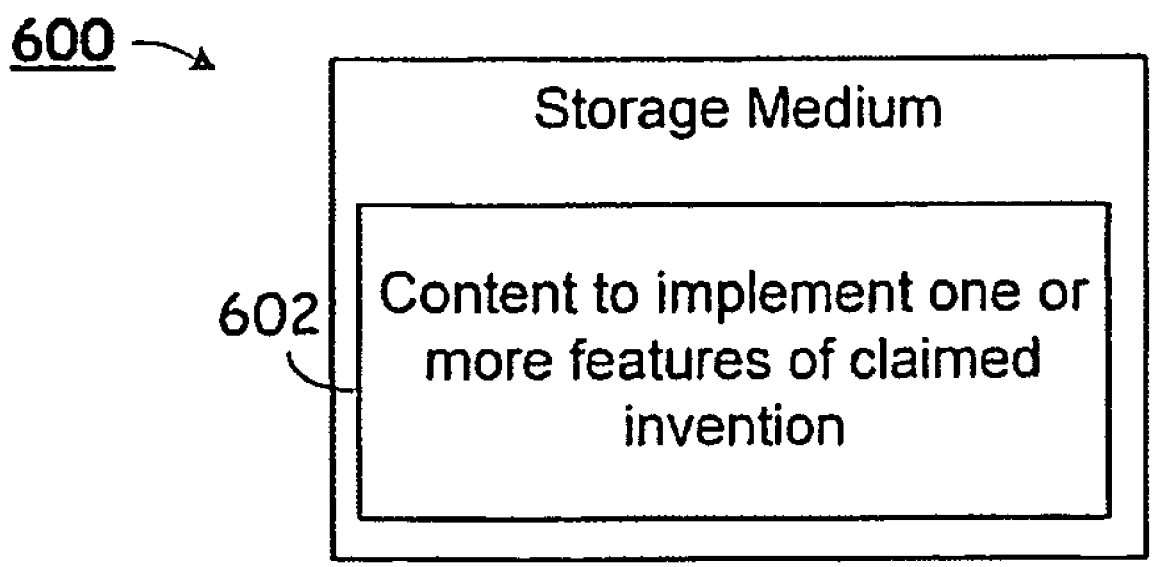
FIG. 6 is a schematic illustration of a block diagram of an example article of manufacture including content which, when executed by an accessing machine, causes the machine to implement one or more aspects of embodiment(s) of the invention.

Turning to FIG. 6, a schematic illustration of a block diagram of an example article of manufacture including content which, when executed by an accessing machine, causes the machine to implement one or more aspects of embodiment(s) of the invention is shown. According to this exemplary embodiment of the invention, a storage medium 400 includes content which, when invoked, may cause an accessing machine to implement one or more aspects of the channel modeling agent 108, feedback generator mechanism 109, associated data structures and/or associated methods 200. In this regard, storage medium 600 may include content 602 (e.g., instructions, data structures, or any combination thereof) which, when executed, causes an accessing device to implement one or more aspects of that introduced above.

The machine-readable (storage) medium 600 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Moreover, the present invention may also be downloaded as a computer program product, wherein the program may be transferred from a remote computer to a requesting computer by way of data signals embodied in a tangible carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect. Such devices may well be employed within any of a variety of Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated info radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

Certain aspects or embodiments of the present invention may include various operations and/or data structures. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any numbers of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

It should be appreciated that according to some embodiments of the present invention, the method described below, may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

The method may be provided as a computer program product that may include a machine-readable medium having stored thereon instructions that may be used to program a computer (or other electronic devices) to perform the method. For the purposes of this specification, the terms "machine-readable medium" may include any medium that is capable of storing or encoding a sequence of instructions for execution by the machine and that cause the machine to perform any one of the methodologies of the present invention. The term "machine-readable medium may accordingly include, but not limited to, solid-state memories, optical and magnetic disks, and a carrier wave that encodes a data signal.

Although the scope of the present invention is not limited in this respect, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. It should be understood that the present invention may be used in a variety of applications.

What is claimed is:

1. A wireless communication device comprising:
   a beamformee unit to convey feedback information by a data unit in one of a set of feedback positions included in a transmit beamforming capability field of said data unit according to response timing capabilities of said beamformee unit, wherein the transmit beamforming capability field includes a beamformee feedback capability value, which is selected by said beamformee unit from at least first and second predefined values, the first predefined value indicating an immediate feedback position for sending feedback response information immediately after a reception of a sounding data unit and the second predefined value indicating a delayed feedback position for sending delayed feedback response information, and the response timing capabilities include at least one of an explicit Beam Form (BF) channel state information (CSI) feedback, an explicit non compressed steering matrix feedback, an explicit compressed steering matrix feedback and a minimal grouping used for an explicit feedback report.

2. The wireless communication device according to claim 1, wherein the beamformee unit is configured to respond immediately and to convey the feedback information in the immediate feedback position and in an aggregated feedback position.

3. The wireless communication device according to claim 1, wherein at least one of the immediate feedback positions and the delayed feedback position is advertised in the data unit.

4. The wireless communication device according to claim 1, wherein the immediate feedback position and the delayed feedback position are advertised in a High Throughput Control (HTC) field within the data unit.

5. The wireless communication device according to claim 1, wherein the feedback information is submitted by a data unit of a type of quality of service null data containing a high throughput control field, containing a management action bit, and wherein the data unit body includes a category field, an action field and a feedback information field.

6. The wireless communication device according to claim 1, wherein the feedback information is submitted by a data unit of management action no-acknowledge and the data unit body contains a category field, an action field and a feedback information field.

7. The wireless communication device according to claim 1, wherein the feedback information is submitted by a data unit of a type and a subtype of management action frame with a frame body containing a category field, an action field and a feedback information field.

8. The wireless communication device according to claim 1, wherein the feedback information is submitted by a high throughput control with a quality of service data unit which includes a null data containing an acknowledgement policy of a normal acknowledge or no acknowledge.

9. The wireless communication device according to claim 1, wherein the feedback information is of different feedback types which include at least a Channel State Information, a non-compressed Steering Matrix feedback and a compressed Steering Matrix feedback.

10. The wireless communication device according to claim 1, wherein the data unit comprises one or more feedback requests and one or more responses.

11. The wireless communication device according to claim 1, wherein the data unit comprises:
    a category field denoting transmit beamforming, an action field denoting a channel state information feedback, and a vector quantized channel state information feedback information field denoting vector quantized explicit feedback information.

12. The wireless communication device according to claim 1, wherein the beamformee unit is configured to group adjacent subcarriers to reduce a wireless communication network overhead.

13. The wireless communication device of claim 1, comprising:
    a beamformer unit to generate a protocol data unit including a control field that includes one of the feedback request information types, which is selected from a Channel State Information, an uncompressed Steering Matrix or a compressed Steering Matrix, to request feedback from a remote communication device.

14. The wireless communication device of claim 13, wherein the beamformer unit is able to recognize a lack of response and to continue to transmit a subsequent data unit.

15. A wireless communication system comprising:
    a beamformee unit to convey feedback information by a data unit in one of a set of feedback positions included in a transmit beamforming capability field of said data unit according to response timing capabilities of said beamformee unit, the response timing capabilities include at least one of an explicit Beam Form (BF) channel state information (CSI) feedback, an explicit non compressed steering matrix feedback, an explicit compressed steering matrix feedback and a minimal grouping used for an explicit feedback report, wherein the beamformee unit is to select a beamformee feedback capability value form at least first and second predefined values, the first predefined value indicating an immediate feedback position for sending feedback response information immediately after a reception of a sounding data unit and the second predefined value indicating delayed feedback position for sending delayed feedback response information, and wherein said beamformee unit is to include the selected beamformee feedback capability value in said transmit beamforming capability field; a beamformer unit to generate a protocol data unit including a control field including one of feedback request information types which is selected from a Channel State Information, an uncompressed Steering Matrix or a compressed Steering Matrix, to request feedback from a remote communication device; and two or more antennas to transmit the data unit and the protocol data unit according to communication exchanging between the beamformee and the beamformer units.

16. The wireless communication system of claim 15, wherein the beamformee unit is to respond immediately and to convey the feedback information in the immediate feedback position and in an aggregated feedback position.

17. The wireless communication system of claim 15, wherein at least one of the immediate feedback positions and the delayed feedback position is advertised in the data unit.

18. The wireless communication system of claim 15, wherein both the immediate feedback position and the delayed feedback position are advertised in the data unit.

19. The wireless communication system of claim 15, wherein the feedback information is submitted by a data unit of a type of quality of service null containing a high throughput control field, containing a management action bit and wherein the data unit body includes a category field, an action field and a feedback information field.

20. The wireless communication system of claim 15, wherein the feedback information is submitted by a data unit of a management action of no-acknowledge and the data unit body contains a category field, an action field and a feedback information field.

21. The wireless communication system of claim 15, wherein the feedback information is submitted by a data unit of a type and a subtype of a management action frame with frame body containing a category field, an action field and a feedback information field.

22. The wireless communication system of claim 15, wherein the feedback information is submitted by a high throughput control with a quality of service data unit which includes a null data containing an acknowledgement policy of a normal acknowledge or no acknowledge.

23. The wireless communication system of claim 15, wherein the feedback information is of different feedback types which include an at least a Channel State Information, a non-compressed Steering Matrix feedback and a compressed Steering Matrix feedback.

24. The wireless communication system of claim 15, wherein the data unit comprises one or more feedback requests and one or more responses.

25. The wireless communication system of claim 15, wherein the data unit comprises:
a category field denoting a transmit beamforming, an action field denoting a channel state information feedback, and a vector quantized channel state information feedback information field denoting a-vector quantized explicit feedback information.

26. The wireless communication system of claim 15, wherein the beamformee unit is to group adjacent subcarriers to reduce a wireless communication system overhead.

27. The wireless communication system of claim 15 comprising a wireless Fidelity (WiFi) system.

28. A method of beamforming comprising:
exchanging one or more communications between a Beamformer and a Beamformee based on Beamformee capabilities of said beamformee,
wherein the exchanging includes conveying feedback information by a data unit feedback position having a transmit beamforming capability field including a beamformee feedback capability value, which is selected by said beamformee based on said beamformee capabilities, form at least first and second predefined values, the first predefined value indicating at least an immediate feedback position and the second predefined value indicating a delayed feedback position,
wherein the Beamformee capabilities include at least one of an explicit Beam Form (BF) channel state information (CSI) feedback, an explicit non compressed steering matrix feedback, an explicit compressed steering matrix feedback and a minimal grouping used for an explicit feedback report.

29. The method of claim 28 comprising:
responding immediately to a beamforming request from the beamformer by conveying the feedback information in the immediate feedback position and in an aggregated feedback position.

30. The method of claim 28 comprising:
responding immediately to a beamforming request from the beamformer by transmitting a data unit that includes at least one of the immediate feedback position and the delayed feedback position.

31. The method of claim 28 comprising:
responding immediately to a beamforming request from the beamformer by transmitting a data unit that includes both, the immediate feedback position and the delayed feedback position.

32. The method of claim 28 comprising:
generating said data unit of a type of quality of service null to submit the feedback information, wherein the data unit contains a high throughput control field, containing a management action bit, and the data unit body includes a category field, an action field and a feedback information field.

33. The method of claim 28 comprising:
generating said data unit of a type of management action no-acknowledge to submit the feedback information, wherein the data unit body contains a category field, an action field and a feedback information field.

34. The method of claim 28 comprising:
generating said data unit of a type a data unit of type and a subtype of management action frame, wherein the management action frame includes a category field, an action field and a feedback information field.

35. The method of claim 28 comprising:
generating said data unit of a type of a high throughput control with quality of service to submit the feedback information, wherein the high throughput control with quality of service data unit includes a null data containing acknowledgement policy of normal acknowledge or no acknowledge.

36. The method of claim 28 comprising:
generating said data unit which includes at least feedback types of a Channel State Information, a non-compressed Steering Matrix feedback and a compressed Steering Matrix feedback.

37. The method of claim 28 comprising:
generating said data unit which includes one or more feedback requests and one or more responses.

38. The method of claim 28 comprising:
generating said data unit which includes a category field denoting transmit beamforming, the action field denoting a channel state information feedback, and a vector quantized channel state information feedback information field denoting vector quantized explicit feedback information.

39. The method of claim 28 comprising:
grouping by the beamformee adjacent subcarriers to reduce a wireless communication system overhead.

40. The method of claim 28 comprising:
generating by the beamformer a protocol data unit including a control field that includes one of the feedback request information types, which is selected from a Channel State Information, uncompressed Steering Matrix or compressed Steering Matrix, to request feedback from a remote communication device.

41. The method of claim 28 comprising:
recognizing by the beamformer unit a lack of response of the beamformee unit; and
continue transmitting a subsequent data unit.

* * * * *

UNITED STATES PATENT AND TRADEMARK OFFICE
CERTIFICATE OF CORRECTION

PATENT NO. : 8,243,749 B2  
APPLICATION NO. : 11/645789  
DATED : August 14, 2012  
INVENTOR(S) : Gal Basson et al.

Page 1 of 1

It is certified that error appears in the above-identified patent and that said Letters Patent is hereby corrected as shown below:

On the Title page, in field (57), in column 2, in "Abstract", line 14, delete "Matrix to" and insert -- Matrix, to --, therefor.

In column 11, line 61, in claim 3, delete "positions" and insert -- position --, therefor.

In column 13, line 21, in claim 17, delete "positions" and insert -- position --, therefor.

In column 13, line 61, in claim 25, delete "a-vector" and insert -- vector --, therefor.

In column 14, line 45, in claim 34, after "a type" delete "a data unit of type".

Signed and Sealed this
Twenty-sixth Day of February, 2013

Teresa Stanek Rea
*Acting Director of the United States Patent and Trademark Office*